United States Patent
Albers et al.

(10) Patent No.: US 10,001,766 B2
(45) Date of Patent: Jun. 19, 2018

(54) INDUSTRIAL CONTROL SYSTEM AND METHOD FOR TRANSFERRING DATA

(71) Applicant: WAGO Verwaltungsgesellschaft mbH, Minden (DE)

(72) Inventors: Thomas Albers, Minden (DE); Werner Kositzki, Minden (DE); Volker Begemann, Porta Westfalica (DE); Martin Dammann, Minden (DE)

(73) Assignee: WAGO VERWALTUNGSGESELLSCHAFT MBH, Minden (DE)

( * ) Notice: Subject to any disclaimer, the term of this patent is extended or adjusted under 35 U.S.C. 154(b) by 426 days.

(21) Appl. No.: 14/799,657

(22) Filed: Jul. 15, 2015

(65) Prior Publication Data

US 2016/0018817 A1 Jan. 21, 2016

(30) Foreign Application Priority Data

Jul. 17, 2014 (EP) .................... 14177438

(51) Int. Cl.
G05B 19/042 (2006.01)
H04L 29/08 (2006.01)

(52) U.S. Cl.
CPC ............ *G05B 19/0426* (2013.01); *G05B 2219/15067* (2013.01); *G05B 2219/21092* (2013.01); *G05B 2219/23301* (2013.01); *G05B 2219/23306* (2013.01); *G05B 2219/25112* (2013.01); *H04L 67/1097* (2013.01)

(58) Field of Classification Search
None
See application file for complete search history.

(56) References Cited

U.S. PATENT DOCUMENTS

| 6,901,298 B1 | 5/2005 | Govindaraj et al. |
| 6,970,891 B1 | 11/2005 | Deo et al. |
| 2002/0091784 A1 | 7/2002 | Baker et al. |

(Continued)

FOREIGN PATENT DOCUMENTS

EP 1 284 446 A1 2/2003

OTHER PUBLICATIONS

Extended European Search Report for corresponding patent application No. 14177438.0 dated Oct. 6, 2014.
(Continued)

*Primary Examiner* — Qing Yuan Wu
(74) *Attorney, Agent, or Firm* — Renner Otto Boisselle and Sklar

(57) ABSTRACT

An industrial control system comprising at least one industrial controller and method of transferring data in an industrial controller include use system-specific firmware of the industrial controller to execute at least one system task of a predefined set of system tasks independently from a user-specific industrial control program. The at least one system task is adapted to use in the operating phase while execution of the instructions defined in the user-specific industrial control program the at least one file system service to move data in a first dedicated storage location of the first data storage unit to a second data storage unit formatted for use with a file system, or use the at least one file system service to move data from the second data storage unit to a second dedicated storage location of the first data storage unit.

15 Claims, 5 Drawing Sheets

(56) References Cited

U.S. PATENT DOCUMENTS

2006/0190106 A1   8/2006   Kay et al.

OTHER PUBLICATIONS

Anonymous: "CyanogenMod"; Wikipedia, the free encyclopedia; retrieved from the Internet: URL:http://en.wikipedia.org/wiki/CyanogenMod; retrieved on Sep. 17, 2014.
Office Action for corresponding European Application No. 14177438.0 dated May 16, 2017.

US 10,001,766 B2

INDUSTRIAL CONTROL SYSTEM AND METHOD FOR TRANSFERRING DATA

This application claims priority of European Application No. 14177438.0 filed Jul. 17, 2014, which is hereby incorporated herein by reference.

TECHNICAL FIELD

The present invention relates to industrial control systems including at least one industrial controller and, more particularly, to a device and method for transferring data from a first storage area of an industrial controller to a second storage area.

BACKGROUND ART

Historically, in industrial controllers, in particular in 16-Bit fieldbus controllers, data was transferred between a first and second data storage unit by simply copying bits stored in known memory locations. For example, for user-specific industrial control programs stored somewhere, e.g., in a flash memory, data was transferred by a so called "MEMCOPY" command, which operated to copy data from a source location into a target location, e.g., a defined memory location in random access memory (RAM) of the industrial controller.

The data transfer operation may occur, for example, when starting and booting the industrial controller to enable the industrial controller to execute instructions provided in the user-specific industrial control program. This procedure of directly transferring data between memory address locations can be performed, for example, by "LOAD FILE" and "READ FILE" commands of a management software having control over the industrial controller. When booting the industrial controller after executing the "MEMCOPY" command, the industrial control program is copied from the flash memory to the industrial controller's RAM, and the industrial control program is then executed from RAM.

Historically, operating systems including file system services have also been available, particularly for industrial controllers making use of standard operating systems such as DOS, Windows and the like. By providing an access layer in form of an access file (e.g., "syslib*.lib" or "syslibfile.lib" file), the user-specific industrial control program could make use of the file system services provided by the operating system. In this manner, the user-specific industrial control program executed on the industrial controller could more flexibly handle data via the file system services. Use of file system services was also available with so called "open controllers" with 16-Bit fieldbus controllers and later also for 32-Bit fieldbus controllers (FBC).

Due to the fact that the user-specific industrial control program can make use of file system services, there is no need to administrate specific address locations and to have knowledge of specific physical address locations on storage units. It is sufficient to define a command that is independent from a specific hardware platform, such as a file open command that uses a dedicated filename, and to read and write data into this file by use of file system service commands. The physical handling of the data is managed by the file system service of the operating system. This reduces the burden on the programmer of a user-specific control program as the programmer does not need to consider details of a specific hardware platform or define data management on the hardware platform. By making file system services accessible through a file system access layer, the user-specific industrial control program, via the file system services, can handle data with regard to storage units on a more abstract level. This enables the user-specific industrial control program, for example, to log data into files, to log changes of data into files (e.g., creating trend files), and to read data from files for use in the industrial control process (e.g., to make use of recipe files and respective recipe data stored therein).

A problem with conventional methods for handling files in an industrial controller via file system services of an operating system is the complexity of the software. More specifically, a user may need to utilize header files and code files to enable the user to define an industrial control program that uses system services of the operating system. In addition, the industrial control program needs to be adapted to a specific hardware platform in order to execute system services of the operating system.

SUMMARY OF INVENTION

The aforementioned problem is solved by the industrial control system of claim 1 and the method for transferring data to or from a first data storage unit of an industrial controller according to claim 15. Preferred embodiments are described in the dependent claims.

An industrial control system and method in accordance with the present invention enable an industrial controller to transfer data stored in a first dedicated storage location (e.g., a data write area) of a first data storage unit of the industrial controller into a file located on a second data storage unit, the transfer implemented with reduced programming complexity in a user-specific industrial control program. Further, the device and method simplify management of data transfer between the first data storage unit and the second data storage unit.

In accordance with the present invention, a user-defined industrial control program that is downloadable to the industrial controller can be configured to simply write data directly into the first dedicated storage location (e.g. a predefined data write area) of the first data storage unit, without using any file system services. In other words, the user-specific industrial control program can be configured to directly write data into predefined and known physical locations of a first dedicated storage location as provided in past-generation industrial controllers. The task of transferring data between the first storage unit and the second storage unit, in contrast to the prior art solutions, can be implemented independent of the user-specific industrial control program. More specifically, the transfer between first and second storage units can be implemented using system-specific firmware stored on the industrial controller.

The system-specific firmware is not programmed or established by a user, but defined by the manufacturer of the industrial controller and adapted to the specifics of the related hardware. Thus, the manufacturer defines the system-specific firmware for the manufacturer's hardware, and such firmware enables the industrial controller to execute related predefined system tasks, independent of the user-specific industrial control program.

The system tasks of the system-specific firmware include a predefined file system task that utilizes file system services to write data stored in the first dedicated storage location of the first data storage unit into a file opened on the second data storage unit. Thus, the step of transferring data from the first dedicated storage location of the first data storage unit into a file located on a second data unit is executed by a predefined system-specific routine, namely the predefined file system task, independently from the user-specific industrial control program. Both, the user-specific industrial control program and the predefined file system task of the system-specific firmware are independent from each other. The system-specific firmware may include further tasks, such as the control of i) a field bus communication, ii) an internal data bus communication of a distributed control system, and the like. Preferably, the system-specific firmware provides all the vendor specific control functions required to use the interfaces and memory hardware of the industrial controller.

Thus, in accordance with the present invention, the user-specific industrial control program may be programmed to write process data or changes of process data, e.g., trend data, into the first dedicated storage location of the first data storage unit. The industrial controller can be configured such that the user-specific industrial control program has no control over the further handling of the data written into the first dedicated storage location of the first data storage unit. The transfer of data stored in first dedicated storage location of the first data storage unit can be handled autonomously by the system-specific firmware. This might result in a situation where the system-specific firmware reads bits from the first dedicated storage location of the first data storage unit even if the industrial control program did not write updated data into the data write area. There also may be a situation where the industrial control program writes process data into the first dedicated storage location, yet no transfer of further processing of this process data is taking place due to a disabled file system task of the system-specific firmware.

Process data include data in the industrial controller used to control a process via bus parts operatively coupled to the industrial controller. Such process can be, for example, an industrial manufacturing process, a process of facility management, e.g., building automation, and the like.

In the context of the present invention the term "control" includes sending control commands to other devices, including the at least one bus part and/or any other control task, as well as monitoring data received from other devices, including the at least one bus part and any other control task.

The term "bus part" (also referred to as control device) includes sensors, actuators, relays, switches or other devices that are directly or indirectly coupled to the industrial controller via a data channel (e.g., a digital input or output, an analog input or output, a communication network, etc.).

The term "user-specific industrial control program" is defined as any program developed by a user of the industrial controller for the purpose of controlling an industrial machine or process. The user-specific industrial control program can be written in one or more different programming languages including, but not limited to, ladder logic, Basic, C++, etc.

The user-specific industrial control program is preferably loaded and installed on the industrial controller in the form of a precompiled executable code (e.g. HEX-code) being executable by a microprocessor. Another option is to provide the user-specific industrial control program as an interpreted code (e.g., JAVA) on the industrial controller, i.e. in a higher level language. This interpreted code requires a conversion into executable code (i.e. compilation) during run-time to enable execution of the code by a microprocessor. Due to the conversion, when executed on the same hardware interpreted code requires more time to execute than compiled code. Similarly, in order for interpreted code to execute in a comparable time frame to compiled code, the interpreted code typically will need to be executed on hardware having more processing power than the hardware executing compiled code In a preferred embodiment, the first data storage unit includes a data read area. In addition, at least one of the predefined system tasks of the system-specific firmware is configured to read data from a file opened on the second data storage unit, and store the data into the data read area of the first storage unit. An advantage of the preferred embodiment is that the industrial controller, in addition to being able to log data into log files, trend files or the like, also can read data stored in such files or other file types and use the data in the industrial control process performed by the user-specific industrial control program. Such data can include recipe data, for example. The recipe data can provide parameters for use in the process controlled by the user-specific industrial control program (e.g., speed setpoints, temperature setpoints, tension setpoints, etc.).

In a preferred embodiment, the industrial controller includes a configuration table that stores predefined firmware task parameters. At least one of the predefined firmware task parameters is related to the file system services to allow at least one of the predefined system tasks of the system-specific firmware to execute tasks using the file system services according to the predefined firmware task parameters. Thus, the basic predefined firmware task can be adapted to the user's specific needs by predefining parameters stored in the configuration table so that the predefined system tasks of the system-specific firmware are adapted to a specific requirement. The adaption of the predefined system tasks of the system-specific firmware need not be implemented in the user-specific industrial control program, and instead can be configured by use of parameters entered and stored into a configuration table. In this manner, the system tasks of the system-specific firmware have access to the parameters in the configuration table. The requirement of writing user-specific routines in an industrial control program to access file system services is no longer necessary, and the task can be implemented via a separate step of entering parameters into a configuration table to configure the system-specific firmware. The option to enter parameters enables a user-specific system to be configured in a much simpler manner, and with regards to program revisions, provides a more flexible mechanism than writing an industrial control program. This is applicable in particular with regard to the use of file system services.

In one preferred embodiment, the configuration table is static, i.e., the table is defined and stored by a user in a configuration step. Optionally, the configuration table can also be set up dynamically, i.e., the table can be changed at the run time of the user-specific industrial control program as a function of specific states of the industrial control system.

The predefined firmware task parameters, for example, can include one or more of
file name
data time
type of a file,
a specific data area of the first data storage on the first data storage unit reserved as a data read area and/or a data write area,
a cycle time defining the time of repetition of a related predefined system task,
an enable flag for a related predefined system task causing activation or deactivation of the related predefined system task, a timer provided to set at least one time to start a related predefined system task, a selection of data variables to be written in a file or read out of a file, a group definition defining a sequence of data variables selected to be written in a file or read out of a file as a group, an event parameter defining an event, which is triggers a process of a related predefined system task.

Any other applicable type of parameters could also be used for the predefined firmware task parameters in order to define an efficient system task of the system-specific firmware.

The file system task of the system-specific firmware, which writes data stored in the first dedicated storage location of the first data storage unit into a file opened an the second data storage unit, is most preferably performed cyclically, i.e., periodically. The cycle time can then be defined by a "cycle time" parameter in the configuration table.

Preferably, the set-up of the predefined firmware task parameters stored in the configuration table can be supported by a web interface. In a preferred embodiment the industrial controller includes a web interface stored on the industrial controller and accessible via a remote network using, for example, a browser. The web interface allows a user to predefine firmware task parameters (e.g., to present entries of a configuration table).

The web interface enables a user at a computer located remote from the industrial controller to simply customize the system-specific firmware to the specific needs, e.g., by entering applicable firmware task parameters, which are then stored into the configuration table for use by the system services of the system-specific firmware.

In a further preferred embodiment, the industrial control system comprises at least one declaration table. The declaration table can include references to data variables of the industrial control program. The system specific firmware can be arranged to handle data stored on the first data storage unit as a function of the entries in the declaration table by use of the file system services. These data are related to the data variables referenced in the at least one declaration table.

The data write area and/or the data read area can be dedicated to a predefined fixed location of the first data storage unit, such that the locations are fixed and cannot be reconfigured. The user can determine the locations of the data read and data write areas, for example, through the industrial controller instruction manual.

In a preferred embodiment, the location of the data write area or the data read area can be configured by the above mentioned predefined firmware task parameters stored in the configuration table. This allows more flexible use of the available hardware.

The data channel provided to communicate with the bus parts can be established using a communication bus (e.g., "backplane bus" or other bus between the industrial controller and the I/O module), wherein the input and/or output modules are communicatively connected to the industrial controller via the communication bus in order to establish a communication link therebetween. The input and/or output modules provide an interface to at least one bus part connected to a respective input/output module.

The industrial controller may also include an internal data channel and internal interfaces to bus parts, so that bus parts can be connected directly to the industrial controller without need for separate input/output modules.

Most preferably, access to the file system services of the operating system by the user-specific industrial control program is disabled in the industrial controller, thereby preventing the user-specific industrial control program from using the file system services. In other words, the industrial controller is preferably arranged to not allow the user-specific industrial control program to execute instructions that invoke any file system services (the file system services are blocked for the user-specific industrial control program). Such blocking of the file system services is advantageous in that the use of the industrial controller is predictable and secure. This simplifies the procedure for approval of an industrial control system.

Most preferably, the industrial controller includes an access table having entries to enable the user-specific industrial control program to use the system services of the operating system. More specifically, there is a separate vendor specific access layer that translates the commands of the user-specific industrial control program to system-specific commands to invoke the system services of the operating system. As in the prior art, the system services include the file system services. It is proposed that the access table has no entries by which commands of the user-specific industrial control program could be linked to file system services of the operating system, so that the file system services of the operating system are blocked for use by the industrial control program. The access table contains other entries than those provided for linkage with the file system services, so that an industrial control program is able to use any other functions of an operating system except the file system service functionality. This results in the file system services of the operating system not being available for the user, even if they are logically present, while the other remaining systems services are available through the entries in the access table. Thus, in contrast to the prior art solutions, in a preferred embodiment the industrial control program is not able to make direct use of the file system services of the operating system.

In the proposed method for transferring data stored on a first dedicated storage location of a first data storage unit of an industrial controller into a file located on a second data storage unit, the steps include:

executing a predefined system task of a system-specific firmware to write data stored in the first dedicated storage location of the first data storage unit into a file opened on the second data storage unit by use of the file system services of the operating system, and executing a user-specific industrial control program to control the at least one bus part, including writing data into the first dedicated storage location of the first data storage unit, wherein the step of executing the predefined system task and the user-specific industrial control program are performed independently without any linking for monitoring or controlling of each other.

More preferably, the method further includes the step of executing the predefined system task of the system-specific firmware to read data out of a file opened on the second data storage unit by use of the file system services of the operating system, and writing the data into a first dedicated storage location (e.g.

a reserved and predefined data read area) of the first data storage unit. In this manner, process data and trend data cannot only be logged into files but also can be read from files for use by the user-specific industrial control program.

In a preferred embodiment, the method further includes the step of storing predefined firmware task parameters in a configuration table of the industrial controller. The predefined firmware task parameters are related to the file system services, and define how at least one of the predefined system tasks of the system-specific firmware use the file system services. By simply entering parameters into a configuration table, the user can define an individual predefined set of system tasks of the system-specific firmware, without the need for writing code for an industrial control program.

Most preferably, the industrial controller is an embedded controller connectable to the so-called cloud. In other words, the industrial controller provides remote access to a data storage unit via a communication network (e.g., the Internet or the Intranet), so that the data storage unit can be located remote from the industrial controller e.g., in a centralized service location for storing data. When preparing the industrial controller to execute a control task, the method then can further include the step of downloading the system-specific firmware from a remote file to the industrial controller. The download can be controlled by the run-time system and the operating system, which preferably are stored on the industrial controller.

Optionally or in addition to the above, when preparing the industrial controller to execute a control task, a related configuration table from a remote file can be downloaded to the industrial controller. The download is most preferably established in the Boot process of the industrial controller, i.e., when the industrial controller is brought into a state to execute a user-specific industrial control program.

The term "run-time system" includes the software code provided for managing the execution of the code of user-specific control program. The run-time system includes the scheduling task, e.g., the management of the execution times, the service provision server, e.g., the tasks of loading, starting, stopping and initializing of the user-specific control program, the monitoring task, the debugging task and the coordination with an integrated development environment IDE.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

In the annexed drawings, like references indicate like parts or features.

DETAILED DESCRIPTION OF INVENTION

Figure 1:
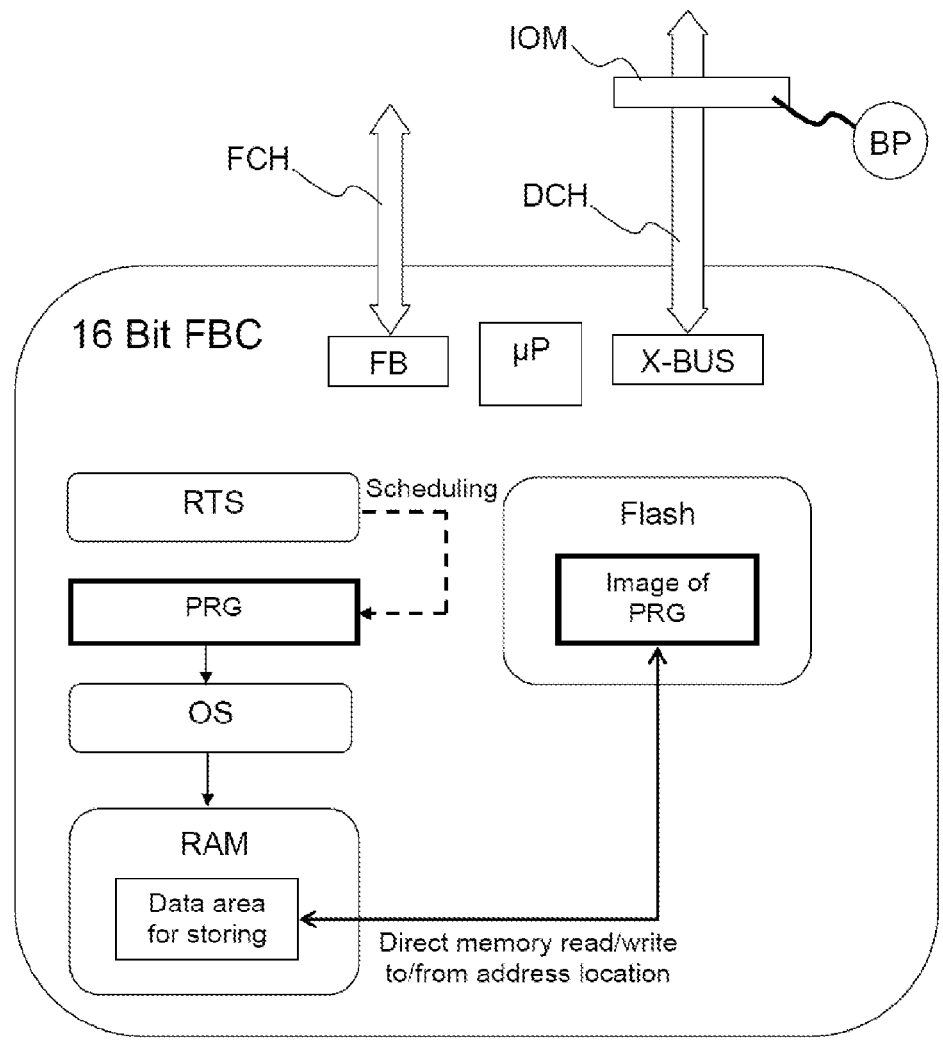
FIG. 1 is a system diagram of a conventional 16-Bit-fieldbus industrial controller with direct memory mapping.

FIG. 1 shows a system diagram of a conventional 16-Bit-fieldbus industrial controller FBC. The fieldbus controller includes a non-volatile RAM memory data storage unit (RAM=Random Access Memory). A microprocessor (not shown) has access to the RAM memory and is arranged to execute an industrial control program PRG. The industrial control program PRG is a user-defined program which may be initially stored on a second storage unit, e.g., a nonvolatile memory such as a flash memory embodied as a memory card (SD card or the like). To enable access to the second storage unit, the fieldbus industrial controller FBC may have, for example, an internal receptacle for receiving the second storage unit (e.g., a flash memory card holder or the like) or a communication bus that can communicatively couple the fieldbus industrial controller FBC to the second data storage unit (which may be located remote from the fieldbus industrial controller FBC).

The basic software stack for allowing the microcontroller of the industrial controller FBC to execute the industrial control program PRG is an operating system OS. The operating system OS comprises a predefined set of system tasks required to execute compiled code of the industrial control program PRG, the industrial control program PRG typically being written by a user via a workstation separate from the industrial controller FBC (e.g., on a computer such as a personal computer or the like). The workstation may include programming languages such as ladder logic, C++, Basic or the like, the user created program typically being compiled at the workstation and then transferred to the second storage unit.

During the boot phase of the 16 Bit fieldbus controller, the executable industrial control program PRG is transferred from the second storage unit (e.g., nonvolatile memory) to the first storage unit (e.g., RAM). Conventionally, such program transfer was done by using file commands such as "MEMCOPY" or like command provided in various operation systems, e.g., DOS, Windows, Nucleus or the like. The MEMCOPY-command executes a direct memory read into a specified address location or a direct memory write from a specified address location. The industrial control program residing in the flash-memory is accessed at a known address location for the image, which is then transferred to predefined known address locations in the first storage unit (RAM memory).

As used herein, the term "boot phase" refers an initial start-up phase of an electronic device (e.g., a microprocessor controlled device) after the device has been powered on or reset, wherein start-up instructions are loaded from memory and then followed by an operating system.

As used herein, the term "operating phase" refers to a phase of the electronic device that occurs subsequent to the boot phase, wherein during the operating phase instructions defined by a user-defined program are executed or executable by the electronic device.

The industrial control program PRG stored in RAM memory and is then executed from this RAM memory location. The execution of the industrial control program is controlled by a run-time-system RTS, which performs scheduling of the industrial control program.

The fieldbus industrial controller FBC also comprises at least one interface X-Bus which provides a data channel DCH communicatively couplable to at least one bus part BP. Such bus part BP can be, for example, a sensor, an actuator or other device used for controlling (including monitoring) an industrial process, a building or the like. The data channel DCH forms an internal bus of an industrial control system, and can be implemented into the housing of the industrial controller FBC or outside of the housing to communicate with input/output-modules IOM forming an Interface between the data channel DCH and the bus parts BP.

The industrial controller FBC further includes an interface FB to an external field data channel FCH. Such a fieldbus interface FB, for example, can support the Ethernet-standard, Profibus-standard, Profinet-standard or the like.

Figure 2:
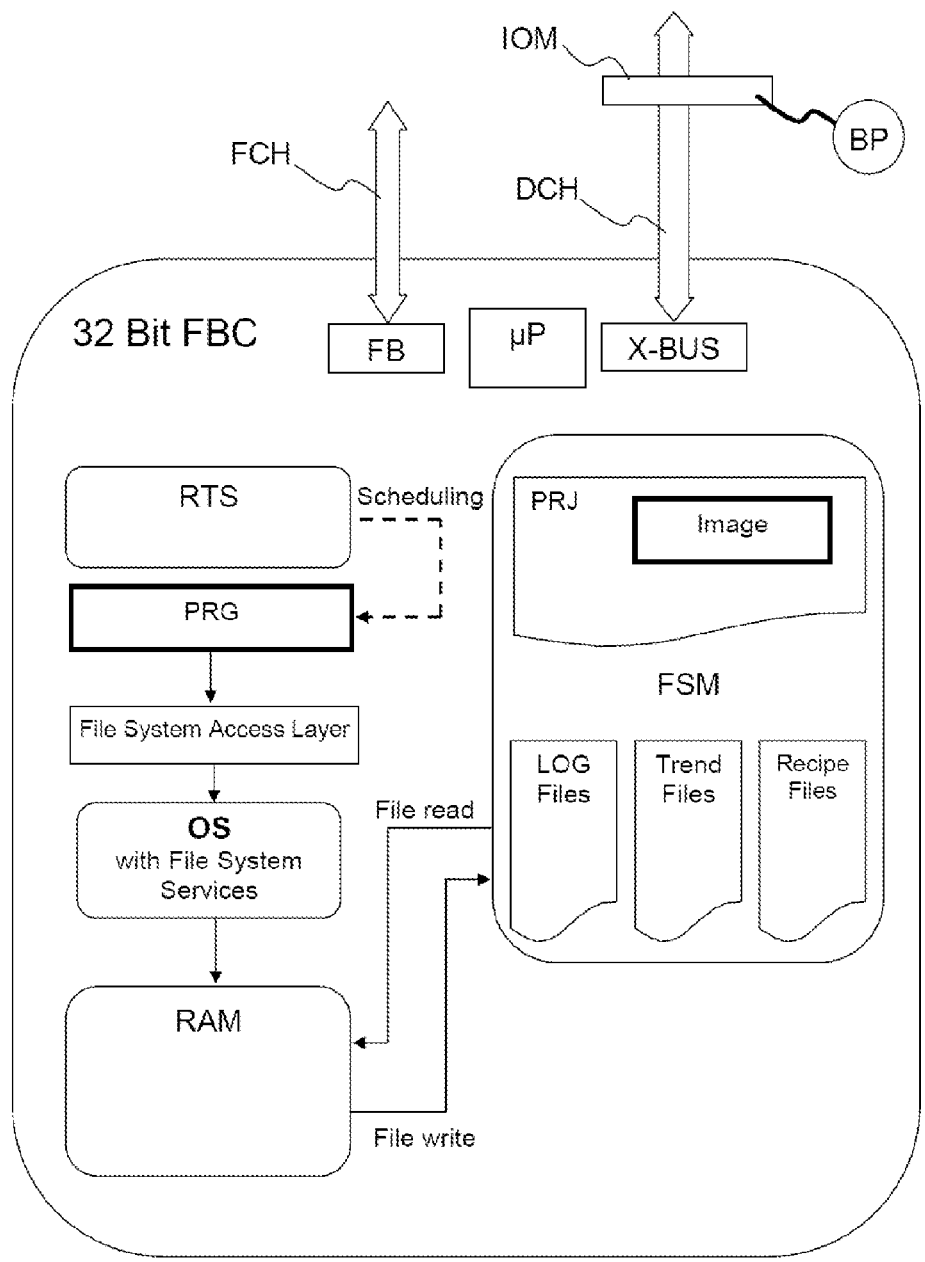
FIG. 2 is a system diagram of a conventional 32-Bit-fieldbus industrial controller including a file system access layer providing an industrial control program access to a file system service of an operating system.

FIG. 2 shows a system diagram of a conventional 32-Bit-fieldbus industrial controller FBC. The fieldbus industrial controller FBC includes a file system access layer that provides access to a file system service of an operating system OS. A user-specific industrial control program PRG is provided access to the file system services through the file system access layer.

As in the example described with regard to FIG. 1, an image of the executable industrial control program is stored in a boot project PRJ on a second data storage unit FSM The second data storage unit is formatted with a file system so that data can be read out or written to the second data storage unit FSM (File System Memory) without specific knowledge of address locations. The use of the file system services of the operating system allows a file to be handled as a separate unit without need to control where the file is physically located on the data storage unit. This physical handling of the data is performed by the file system services itself.

When booting the fieldbus industrial controller FBC a copy of the industrial control program PRG is transferred from the image in the boot project PRJ containing the image to a dedicated memory area in the first data storage unit RAM. Later, when executing the industrial control program PRG, process data can be transferred into specific log or trend files to log data or to log changes of data (trend). This data transfer of process data can be performed by the industrial control program PRG without having direct control over the physical data address locations on the second data storage unit FSM. The user-specific industrial control program PRG is able to open an existing log, trend or recipe file or to make a new file by accessing the file system services of the operating system OS. Typically, the file system services of the operating system OS are not directly accessible to a compiled executed code of the industrial control program PRG and, therefore, an intermediate file system access layer is typically required to translate the compiled commands to the language of the operation system.

By use of the file system services, the industrial control program PRG is also able to read data out of the file system memory FSM, e.g., to control the specific parameters of the industrial control process. The control parameters are generally known as recipe data. For example, in a process of automatic mixing of colours from different colour sources, the recipe data can define a specific formula for a particular colour to be mixed. Recipe data also can specify the speed of various machine sections, web tensions, section temperatures, pressures, etc.

Figure 3:
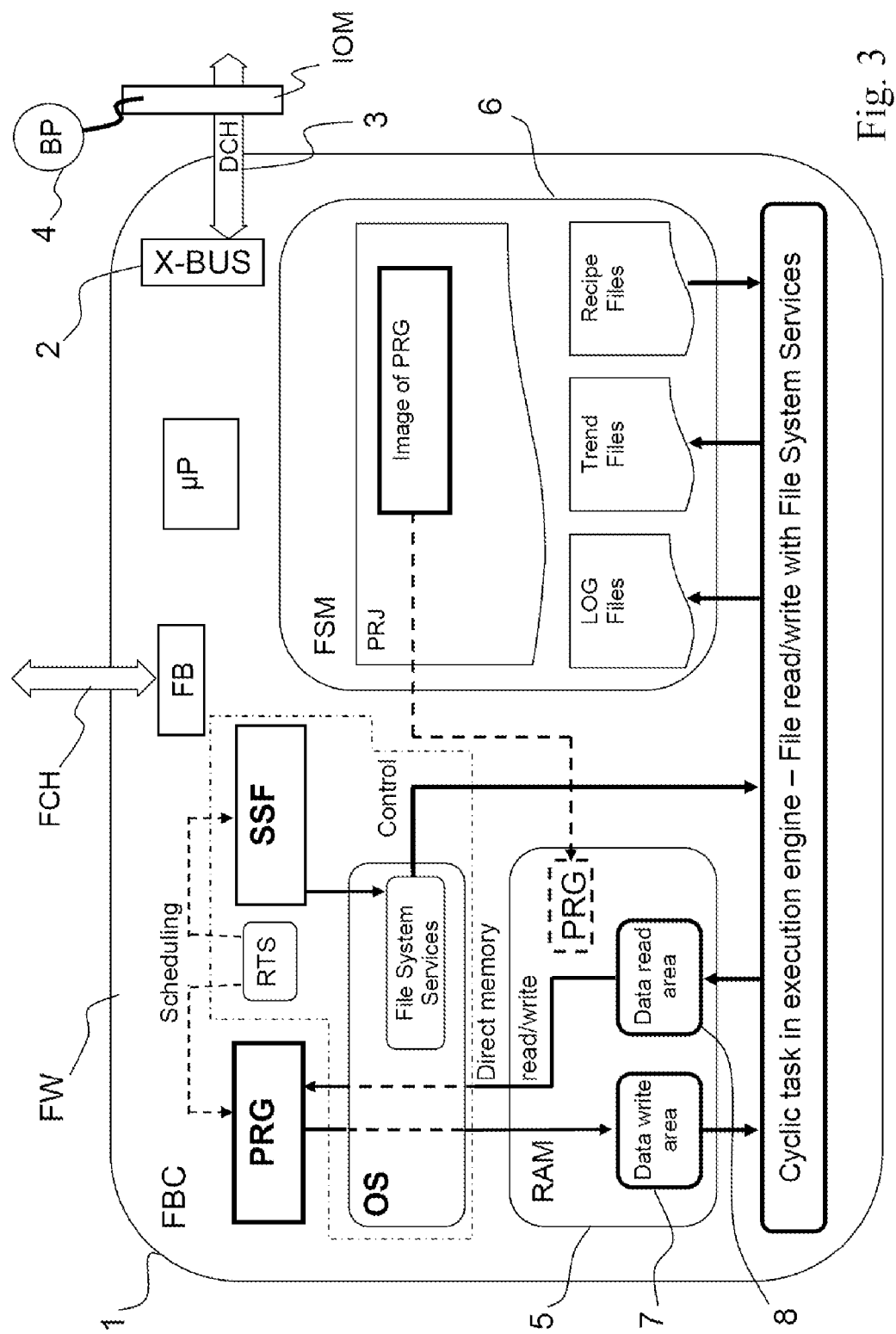
FIG. 3 is a system diagram of an exemplary industrial controller in accordance with the present invention, the industrial controller including a separate system-specific firmware that can execute file system tasks.

FIG. 3 shows a schematic diagram of an exemplary industrial controller 1 in accordance with the present invention. The industrial controller 1 can be a fieldbus industrial controller FBC having a microprocessor µP arranged to execute software tasks defined by the operating system OS, a run-time-system RTS, a user-specific industrial control program PRG and also by a system-specific firmware SSF.

Further, the exemplary industrial controller 1 may include a fieldbus interface FB which provides a fieldbus data channel FCH. The fieldbus data channel FCH provides a data channel that can be used to communicate with at least one other industrial controller or supervising workstation thereby forming a control system for controlling industrial control process. The fieldbus data channel FCH also allows the industrial controller 1 to control other industrial controllers used to control the process.

The exemplary industrial controller 1 may include an internal X-Bus interface 2 providing a data channel 3 for communicating with at least one bus part 4.

The exemplary industrial controller 1 further includes a first data storage unit 5 (RAM memory) and a second data storage unit 6 (FSM). While the second data storage unit 6 is shown as part of the industrial controller, the second data 5 storage unit could be separate from the industrial controller 1. In this regard, the industrial controller 1 may include an Interface for a separate second data storage unit 6, e.g., a card slot or the like to receive a separate memory card (e.g., an SD card). The Interface for the second data storage unit 6 may also be the fieldbus interface FB to the fieldbus data channel FCH, e.g., the second data storage unit may be communicatively coupled to the industrial controller 1 via the fieldbus data channel FCH so as to enable the industrial controller to write data to and read data from the second data storage unit.

The interface to the second data storage unit 6 may also be the X-Bus interface 2, wherein the second data storage unit 6 is communicatively coupled to the industrial controller 1 via the data channel 3. Thus, the data stored on the second data storage unit 6 could be stored into the so-called cloud.

The exemplary industrial controller 1 further includes a plurality of software stacks. The software stacks include a run-time system RTS configured to schedule at least one user-specific industrial control program PRG and the system-specific firmware SSF.

Another software stack is the operating system OS, which, among other things, comprises at least one and preferably a plurality of file system services.

The operating system OS, the run-time-system RTS and the system-specific firmware SSF can be installed on the industrial controller 1 as separate executable codes, e.g., separate shell-code. The operating system OS, the run-time-system RTS and the system-specific firmware SSF could also be installed on the industrial controller 1 in a combined executable firmware code FW, e.g., a single hex-file with the operating system OS being embedded into the higher-level firmware, as indicated by the dotted box.

As it can be seen in the exemplary industrial controller of FIG. 3 relative to the controller of FIG. 2, the file system access layer to the industrial control program is missing. As a result, the user-specific industrial control program PRG residing in the exemplary industrial controller 1 of FIG. 3 does not have access to the file system services of the operating system OS.

In accordance with the present invention, the system-specific firmware SSF is configured to execute a predefined set of system tasks independently from the user-specific industrial control program PRG.

The predefined system tasks include file handling tasks for copying data stored in a first dedicated storage location, e.g., as in this example the data write area 7 (also referred to as a first storage region) of the first data storage unit 5 into a file opened on the second data storage unit 6. in copying data, the file handling tasks use the file system services of the operation system OS. Thus, the system-specific firmware SSF, not the user-specific industrial control program PRG, handles the files stored on the second data storage unit 6.

The storage addresses of the data write area 7 or, optionally, a plurality of storage location distributed over the storage area of the first data storage unit 5, is well defined and known to the industrial control system.

In the exemplary embodiment the user-specific industrial control program PRG only has access to the data stored in the first data storage unit 5, e.g., via direct memory read and write access to dedicated physical address locations. Thus, the industrial control program PRG executing on the exemplary industrial controller 1 is only able to execute direct memory read/write commands, without utilizing the file system services.

In the boot mode of the industrial controller 1, the system-specific firmware SSF can handle the transfer of the image of the program PRG from the second data storage unit 6 to a specific location of the first data storage unit 5.

After finalizing the boot process the industrial controller enters run mode. In run mode, the specific firmware SSF has control over opening files in the second data storage unit 6, e.g., log files, trend files, recipe files, etc., and transferring data from a specific physical address location of the data write area 7 into an appropriate file, e.g., a log file or a trend file. Further the system-specific firmware SSF can execute a task that, via the file system services of the operating system OS, reads data out of a recipe file stored on the second data storage unit 6 and writes the recipe data into the data read area 8 (also referred to as a second storage region) of the first data storage unit 5 (RAM). The handling of the data transfer between the first data storage unit 5 and the second data storage unit 6 via the file system services can be performed fully independently from the user-specific industrial control program PRG, without the user-specific industrial control program having any control of the file system services.

The exemplary industrial controller 1 can be configured to allow the user-specific industrial control program PRG to write data directly to the data write area 7 of the first data storage unit 5, without use of the file systems services. Accordingly the industrial controller 1 can also be configured to allow the user-specific industrial control program PRG read data directly out of the data read area 8 of the first data storage 5, without using the file system services.

In particular, the file system services of the operating system OS can be disabled for the user-specific industrial control program PRG. In other words, the industrial controller 1 can be configured such that the user-specific industrial control program PRG cannot use the file system services.

The industrial controller 1 most preferably includes a configuration task that includes a user-settable parameter for controlling the system-specific firmware SSF. The configuration task can be accessed, for example, using a web server. Access to the web server, for example, can be via the fieldbus interface FB and the fieldbus data channel FCH using, for example, a browser of a remote computer. The configuration task may allow the user to configure a plurality of predefined firmware task parameters that customize the predefined system tasks of the specific firmware. These predefined firmware task parameters can include one or more parameters as described below.

The firmware task parameters can include a parameter that describes a file name for the different log files, trend files and/or recipe files. The firmware task parameters also can include a parameter that describes data types handled in such files, the type of a file, e.g., log file, trend file or recipe file. Further, the predefined firmware task parameters can include a parameter that defines a specified data area of the first data storage unit 5 that is dedicated to the data read area 7 and the data write area 8. Thus, the system-specific firmware SSF has control over the physical data locations of the data write area 6 and data read area 7.

Further, the predefined firmware task parameters may include a parameter that defines a cycle time that sets the period of repetition (also referred to as scan time) for a corresponding predefined system task. In a preferred embodiment, the system-specific firmware SSF executes a task that repeatedly reads data from and writes data to files in the second data storage unit 6, e.g., in intervals defined by the cycle time parameter.

Further, the predefined firmware task parameters can include a parameter that enables and disables one or more of the predefined system tasks, including the file system task. For example, by setting the parameter to enable for a log file system task, data written in the data write area 7 of the first data storage unit 5 are repeatedly written into a log file opened on the second data storage unit 6. Moreover, logging of data occurs independent from the user-defined industrial control program PRG. This might have the effect that data in the data write area 7 are written into the log file even if the industrial control program PRG does not write any actual data into the data write area 7. Disabling the file system task via the parameter may also have the effect that no data are logged into files, even if the industrial control program PRG writes data into the data write area 7 of the first data storage unit 5.

By use of the configuration task, it is possible also to define a timer as a predefined firmware task parameter to define a time when a related predefined systems task, e.g., logging process files or logging trend files, is started. Thus it could be defined that data are logged at specific times rather than in specific cycles.

The predefined firmware task parameters can include a parameter that selects data variables that indicate an attribute of the data, e.g., a file from which the data was read, a time and/or date at which the data was originally logged and/or retrieved, etc.

The predefined firmware task parameters can also include a parameter that defines a plurality of data that is written to or read from the file on the second storage unit as a group. In this regard, the group can be defined by a sequence of data. Such a group, for example, may be a measurement value (e.g., temperature), the calendar date on which the measurement was made, and the location of the measurement. Such location might be the name of the related bus part 4 where the measurement was made. Further, an event parameter can be configured that defines an event for triggering a process of a related predefined system task. Such an event could be triggered when a measurement value is less than, equal to or greater than a threshold value. For example, an event parameter could be a specific temperature measured by a bus part 4. When the measured temperature reaches the threshold value, the measurement value together with the time and the name of the bus part 4 would then be logged into a file. Other events could be system errors of a bus part and the like. The events can be provided in a list such that the system-specific firmware SSF regularly checks whether an event in the list is present, in order to record the event together with a time stamp. The events could also be provided in the form of a time diagram of variables.

The configuration task is most preferably accessed by a web interface that is stored on the industrial controller 1 and accessible via a remote network FCH using, for example, a browser. The web interface enables a user to define the entries of the configuration table, thereby allowing the user to customize the industrial controller to his specific needs. The predefined firmware task parameters are related to the file system services in that they allow at least one of the predefined system tasks of the system-specific firmware SSF to execute tasks that include the use of the file system services.

Figure 4:
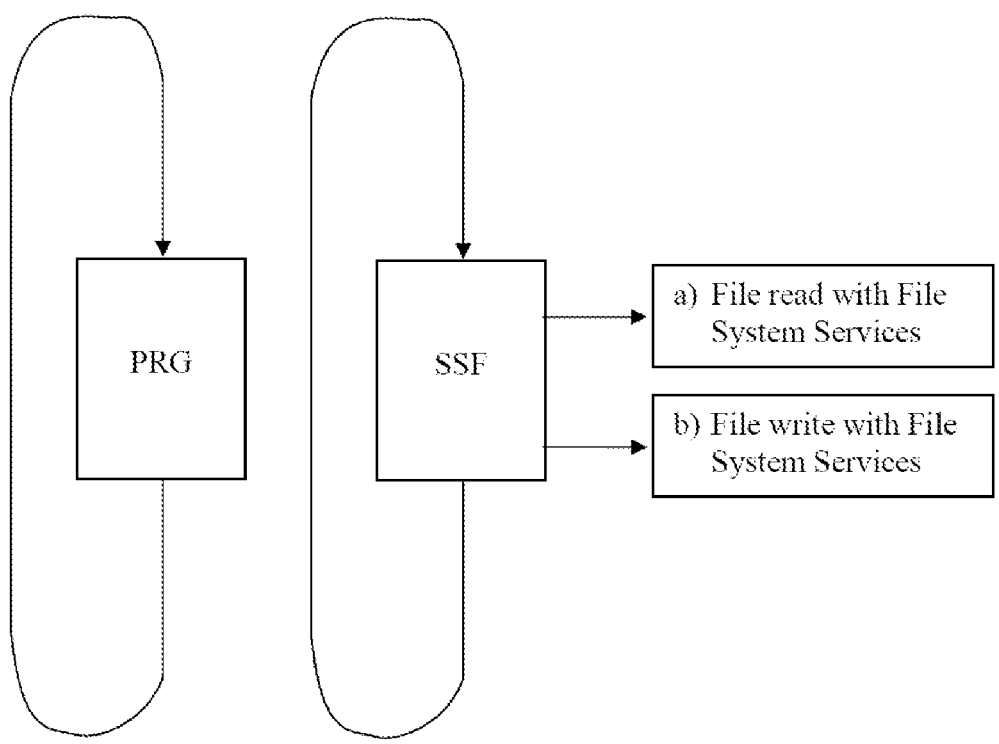
FIG. 4 is a flow chart illustrating a user-defined industrial program and system-specific firmware executing on an industrial controller in accordance with the present invention.

Referring now to FIG. 4, there is shown a flow chart illustrating a general overview of a method of transferring data within an industrial controller. More specifically, FIG. 4 illustrates a user-defined industrial control program PRG and a system-specific firmware SSF, the system-specific firmware SSF executing independent of the user-defined industrial control program PRG.

As disclosed herein, the user-defined industrial control program PRG is a program having instructions specified by a user, e.g., the user has complete control over the content of the user-defined industrial control program PRG. In contrast, the system-specific firmware SSF includes instructions specified, for example, by a manufacturer of the industrial controller. The user has no control over the content of the system specific firmware SSF.

The method for transferring data to or from a first data storage unit of the industrial controller 1 uses the system-specific firmware SSF of the industrial controller 1 to execute at least one system task of a predefined set of system tasks independently from the user-specific industrial control program PRG. FIG. 4 shows the operating phase while execution of the instructions defined in the user-specific industrial control program PRG. The at least one system task being executed by use of the system-specific firmware SSF is adapted to a) use the at least one file system service to move data in a first dedicated storage location 7 of the first data storage unit 5 to a second data storage unit 6 formatted for use with a file system, or b) use the at least one file system service to move data from the second data storage unit 6 to a second dedicated storage location 8 of the first data storage unit 5.

More specifically, the system specific firmware SSF executes a system task based, for example, on a table that is configurable by the user. In this regard, the user may enable and disable system tasks of the system specific firmware SSF. For example, the user may enable or disable system tasks corresponding to a read and/or write operations (e.g., read from a log file, write to a log file), configure a scan rate of such read/write operations, etc.

For example, in creating the user-defined industrial control program PRG the user may wish to log data to a trend file or other file. In this regard, the user may include instructions in the user-defined industrial control program PRG that writes application data from the user-defined industrial control program PRG to a specific area of memory, e.g., the data write area 7. Such writing of data to the data write area 7 is implemented in the user-defined industrial control program PRG without the use of file system services.

Independent of the user-defined industrial control program, the system-specific firmware SSF, based on settings in the configuration table, may write the data stored into the data write area 7 into an appropriate file, e.g., a log file. Such writing of data by the system-specific firmware SSF into the file may be implemented using file system services.

Similarly, in creating the user-defined industrial control program PRG the user may wish to read data stored in a log file, for example, from a trend file, into the industrial control program PRG. In this regard, the user may configure the system-specific firmware SSF, via the configuration table, to execute a system task that reads data from the log file and writes the data into a specific area of memory, e.g., the data read area 8. Such writing of data by the system-specific firmware SSF may be executed using file system services.

To utilize such log data in the user-defined industrial control program PRG, the user may include instructions in the user-defined industrial control program PRG that reads the data from the data read area 8 into the industrial control program PRG. Such reading of data from the data read area 8 to the user-defined industrial control program PRG is implemented without the use of file system services.

Accordingly, the industrial controller in accordance with the present invention can write and read data to/from files, without the user-defined industrial control program invoking file system services.

Figure 5:
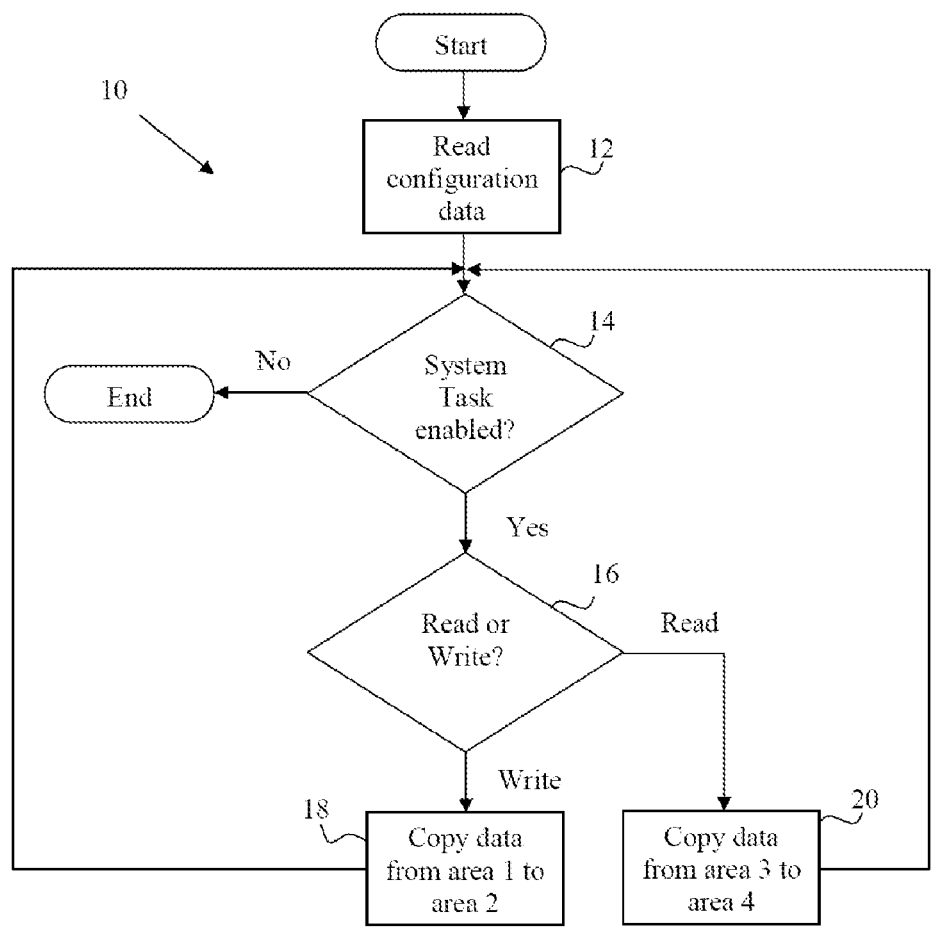
FIG. 5 is a flow chart illustrating exemplary steps executed by system-specific firmware in accordance with the present invention.

With additional reference to FIG. 5, illustrated in more detail are exemplary logical operations to implement an exemplary method of transferring data within an industrial controller. The flow chart 10 of FIG. 5 may be thought of as depicting steps of a method carried out by the system-specific firmware SSF of the industrial controller 1. Although FIG. 5 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

Beginning at block 12, the system-specific firmware SSF reads configuration data, for example, from a user-configurable configuration table. As described herein the system-specific firmware SSF includes one or more system tasks that can be enabled or disabled via entries in the user configurable configuration table. The settings within the configuration table can be read by the industrial controller's processor during power up. Based on the settings from the table, the processor can determine, for example, which predefined system tasks are or are not enabled, to which areas of memory data will be read and/or written, etc.

Moving to block 14, the system-specific firmware SSF determines if any system tasks have been enabled, e.g., a system read task or a system write task. If no system tasks have been enabled, then the method ends. If, however, system tasks have been enabled, then at block 16 the system-specific firmware SSF determines if the system task corresponds to a read Operation or a write operation.

If the system task corresponds to a write operation, then at block 18 the system-specific firmware SSF reads data stored in the data write area 7 (the data in the data write area 7 may have been placed there by the user-specified industrial control program am PRG) and writes the data into a file, where the write operation implemented by the system-specific firmware SSF can utilize file system services. As disclosed herein, the specific area of memory, the frequency at which the write operation is executed, the destination file, etc. all can be specified in the system-specific firmware's user-configurable configuration table.

Once the write operation has been completed, the method moves back to block 14 and the process repeats.

Moving back to block 16, if the system task corresponds to a read operation, then at block 20 the system-specific firmware SSF reads data stored in a specific file (e.g., a log file, a trend file, etc.) and writes the data into the data read area 8, where the read operation implemented by the system-specific firmware SSF can utilize file system services. The user-specified industrial control program then can access the data.

Again, and as noted above, the specific area of memory, the frequency at which the read operation is executed, the file from which data is read, etc. all can be specified in the system-specific firmware's user-configurable configuration table. Once the read operation has been completed, the method moves back to block 14 and the process repeats.

Although the invention has been shown and described with respect to a certain embodiment or embodiments, equivalent alterations and modifications may occur to others skilled in the ad upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein exemplary embodiment or embodiments of the invention. In addition, while a particular feature of the invention may have been described above with respect to only one or more of several embodiments, such feature may be combined with one or more other features of the other embodiments, as may be desired and advantageous for any given or particular application.

In the following further preferred embodiments of the invention are described:

1. An industrial control system comprising at least one industrial controller (1) having an operating phase for executing instructions defined in a user-specific industrial control program (PRG), said industrial controller (1) comprising:
   at least one microprocessor (μP);
   at least one file system service;
   a run-time system (RTS) adapted to manage execution of instructions using the at least one microprocessor (μP), said instructions being defined in the user-specific industrial control program (PRG);
   a first data storage unit (5) for storing data in the industrial controller (1); and
   system-specific firmware (SSF) adapted to execute during the operating phase a predefined set of system tasks independently from the instructions defined in the user-specific industrial control program (PRG), wherein at least one system task of the predefined set of system tasks is configured to
   a) use the at least one file system service to address a first dedicated storage location on the first data storage unit (5) and to move data in the first dedicated storage location of the first data storage unit (5) to a second data storage unit (6) formatted for use with a file system, and/or
   b) use the at least one file system service to address a second dedicated storage location on the first data storage unit (5) and to move data from the second data storage unit (6) to the second dedicated storage location of the first data storage unit (5).

2. The industrial control system according to number 1, characterized in, that said industrial controller (1) further comprising the second data storage unit (6).

3. The industrial control system according to number 1 or 2, wherein the user-specific industrial control program (PRG) is inhibited from accessing the at least one file system service.

4. The industrial control system according to number 3, wherein the run-time system (RTS) is adapted to inhibit the user-specific industrial control program (PRG) from accessing the file system services.

5. The industrial control system according to one of the preceding numbers, wherein the user-specific industrial control program (PRG) is adapted to at least one of write data to the first dedicated storage location or read data from the second dedicated storage location.

6. The industrial control system according to one of the preceding numbers, wherein at least one system task of the predefined set of system tasks is adapted to write the data stored in the first dedicated storage location of the first data storage unit (5) to a file opened on the second data storage unit (6).

7. The industrial control system according to one of the preceding numbers, wherein at least one system task of the predefined set of system tasks is adapted to write data from a file opened on the second data storage unit (6) into the second dedicated storage location of the first data storage unit (5).

8. The industrial control system according to one of the preceding numbers, further comprising a configuration table defining a plurality of configuration parameters for the predefined set of system tasks.

9. The industrial control system according to number 8, wherein at least one of the plurality of configuration parameters is adapted to enable a system task of the predefined set of system tasks in the operating phase to utilize the file system services to at least one of
   move data located in the first dedicated storage location of the first data storage unit (5) to a second data storage unit (6), or
   move data located in the second data storage unit (6) to the second dedicated storage location of the first data storage unit (5).

10. The industrial control system according to numbers 8 or 9, wherein the configuration table comprises a system task configuration parameter corresponding to at least one of:
   a file name;
   a data type;
   a file type;
   a location in the first data storage unit (5) for the first dedicated storage location;
   a location in the first data storage unit (5) for the second dedicated storage location;
   a data variable of the user-specific industrial control program (PRG);
   a scan time defining a time of repetition of a system task of the predefined set of system tasks;

an enable flag for a system task of the predefined set of system tasks, the enable flag causing the system task to be enabled or disabled;

a timer defining a start time for a system task of the predefined set of system tasks;

a selection of data variables to be written in a file or read out of a file, a group definition defining a sequence of data variables selected to be written in a file or read out of a file as a group; or an event parameter defining an event triggering a process of a related system task of the predefined set of system tasks.

11. The industrial control system according to one of the preceding numbers, further comprising a web interface accessible via a network, wherein the plurality of configuration parameters are remotely accessible through the web interface.

12. The industrial control system according to one of the preceding numbers, wherein at least one of the first dedicated storage location or the second dedicated storage location is a fixed contiguous region in the first data storage unit (5).

13. The industrial control system according to one of the preceding numbers, said industrial control system comprising at least one declaration table, said declaration table comprising references to data variables of the industrial control program (PRG), said system specific firmware (SSF) being arranged for handling data on the first data storage unit (5) which data are related to said data variables referenced in said at least one declaration table by use of the file system services.

14. The industrial control system according to one of the preceding numbers, further comprising at least one input/output device coupleable to a control device, the at least one input/output device adapted to provide a command from the user-specific industrial control program (PRG) to the control device, or receive data from the control device for use by the user-specific industrial control program (PRG).

15. The industrial control system according to one of the preceding numbers, said industrial controller (1) further comprising an access table comprising at least one parameter that enables or inhibits the user-specific industrial control program (PRG) from accessing the file system services, the at least one parameter inaccessible by the user-specific industrial control program (PRG).

16. The industrial control system according to one of the preceding numbers, wherein the at least on industrial controller (1) comprises the system specific firmware (SSF) for execution by the respective industrial controller (1).

17. The industrial control system according to one of the preceding numbers, further comprising a computer remote from the at least one industrial controller (1), and a communication network, wherein the computer is communicatively coupled to the at least one industrial controller (1) by the communication network, wherein the system specific firmware (SSF) is stored on the computer for execution on the computer and being arranged for transferring data between dedicated storage locations of the first data storage unit (5) and the second data storage unit by use of file system services of the computer.

18. A method for transferring data to or from a first data storage unit (5) of an industrial controller (1), the industrial controller (1) including at least one file system service and being adapted to execute during an operating phase of the industrial controller (1) instructions defined in a user-specific industrial control program (PRG), the method comprising:

using system-specific firmware (SSF) provided for the industrial controller (1) to execute at least one system task of a predefined set of system tasks independently from the user-specific industrial control program (PRG), wherein in the operating phase the at least one system task is adapted to a) use the at least one file system service to move data in a first dedicated storage location of the first data storage unit (5) to a second data storage unit (6) formatted for use with a file system, or b) use the at least one file system service to move data from the second data storage unit (6) to a second dedicated storage location of the first data storage unit (5).

19. The method according to number 18, further comprising inhibiting the user-specific industrial control program (PRG) from accessing the at least one file system service.

20. The method according to numbers 18 or 19, further comprising using the user-specific industrial control program (PRG) to at least one of write data to the first dedicated storage location of the first data storage unit (5) or read data from the second dedicated storage location of the first data storage unit (5).

21. The method according to one of numbers 18 to 20, further comprising using at least one system task of the predefined set of system tasks to write the data stored in the first dedicated storage location of the first data storage unit (5) to a file opened on the second data storage unit (6).

22. The method according to one of numbers 18 to 21, further comprising using at least one system task of the predefined set of system tasks to write data from a file opened on the second data storage unit (6) into the second dedicated storage location of the first data storage unit (5).

23. The method according to one of numbers 18 to 22, further comprising configuring the predefined set of system tasks via a configuration table defining configuration parameters for the predefined set of system tasks.

24. The method according to number 23, wherein the configuration parameters include at least one of:

a file name;

a data type;

a file type;

a location in the first data storage unit (5) for the first dedicated storage location;

a location in the first data storage unit (5) for the second dedicated storage location;

a data variable of the user-specific industrial control program (PRG);

a scan time defining a time of repetition of a system task of the predefined set of system tasks;

an enable flag for a system task of the predefined set of system tasks, the enable flag causing the system task to be enabled or disabled;

a timer defining a start time for a system task of the predefined set of system tasks;

a selection of data variables to be written in a file or read out of a file, a group definition defining a sequence of data variables selected to be written in a file or read out of a file as a group; or an event parameter defining an event triggering a process of a related system task of the predefined set of system tasks.

25. The method according to number 23 or 24, further comprising using a web interface accessible via a network to remotely access the plurality of configuration parameters.

26. The method according to one of number 18 to 25, further comprising using an access table defining at least one parameter to enable or inhibit the user-specific industrial control program (PRG) from accessing the file system services, wherein the at least one parameter is inaccessible by the user-specific industrial control program (PRG).

27. The method according to one of numbers 18 to 26, further comprising executing the system-specific firmware (SSF) on a microprocessor (µP) of the at least one industrial controller (1).

28. The method according to one of numbers 18 to 27, further comprising executing the system-specific firmware (SSF) on a computer remote from the at least one industrial controller (1), said computer communicating with the at least one industrial controller (1) via a communication network for transferring data between dedicated storage locations of the first data storage unit (5) and the second storage unit (6) by use of file system services of the computer.

The invention claimed is:

1. An industrial control system comprising at least one industrial controller having an operating phase for executing instructions defined in a user-specific industrial control program, said at least one industrial controller comprising:
   at least one microprocessor;
   at least one file system service;
   a run-time system adapted to manage execution of instructions using the at least one microprocessor, said instructions being defined in the user-specific industrial control program;
   a first data storage unit for storing data in the at least one industrial controller; and
   system-specific firmware adapted to execute during the operating phase a predefined set of system tasks independently from the instructions defined in the user-specific industrial control program, wherein at least one system task of the predefined set of system tasks is configured to
   a) use the at least one file system service to address a first dedicated storage location on the first data storage unit and to move data in the first dedicated storage location of the first data storage unit to a second data storage unit formatted for use with a file system, and/or
   b) use the at least one file system service to address a second dedicated storage location on the first data storage unit and to move data from the second data storage unit to the second dedicated storage location of the first data storage unit; and
   a configuration table defining a plurality of configuration parameters for the predefined set of system tasks, wherein the configuration table is changeable at run time of the user-specific industrial program as a function of specific states of the industrial control system.

2. The industrial control system according to claim 1, wherein, that said at least one industrial controller further comprising the second data storage unit.

3. The industrial control system according to claim 1, wherein the user-specific industrial control program is inhibited from accessing the at least one file system service.

4. The industrial control system according to claim 3, wherein the run-time system is adapted to inhibit the user-specific industrial control program from accessing the at least one file system service.

5. The industrial control system according to claim 1, wherein the user-specific industrial control program is adapted to at least one of write data to the first dedicated storage location or read data from the second dedicated storage location.

6. The industrial control system according to claim 1, wherein at least one system task of the predefined set of system tasks is adapted
   to write the data stored in the first dedicated storage location of the first data storage unit to a file opened on the second data storage unit; and/or
   to write data from a file opened on the second data storage unit into the second dedicated storage location of the first data storage unit.

7. The industrial control system according to claim 1, wherein at least one of the plurality of configuration parameters is adapted to enable a system task of the predefined set of system tasks in the operating phase to utilize the file system service to at least one of
   move data located in the first dedicated storage location of the first data storage unit to the second data storage unit, or
   move data located in the second data storage unit to the second dedicated storage location of the first data storage unit.

8. The industrial control system according to claim 7, wherein the configuration table comprises a system task configuration parameter corresponding to at least one of:
   a file name;
   a data type;
   a file type;
   a location in the first data storage unit for the first dedicated storage location;
   a location in the first data storage unit for the second dedicated storage location;
   a data variable of the user-specific industrial control program;
   a scan time defining a time of repetition of a system task of the predefined set of system tasks;
   an enable flag for a system task of the predefined set of system tasks, the enable flag causing the system task to be enabled or disabled;
   a timer defining a start time for a system task of the predefined set of system tasks;
   a selection of data variables to be written in a file or read out of a file,
   a group definition defining a sequence of data variables selected to be written in a file or read out of a file as a group; or
   an event parameter defining an event triggering a process of a related system task of the predefined set of system tasks.

9. The industrial control system according to claim 1, further comprising a web interface accessible via a network, wherein the plurality of configuration parameters are remotely accessible through the web interface.

10. The industrial control system according to claim 1, wherein at least one of the first dedicated storage location or the second dedicated storage location is a fixed contiguous region in the first data storage unit.

11. The industrial control system according to claim 1, further comprising at least one input/output device coupleable to a control device, the at least one input/output device adapted to provide a command from the user-specific industrial control program to the control device, or receive data from the control device for use by the user-specific industrial control program.

12. The industrial control system according to claim 1, said at least one industrial controller further comprising
an access table comprising at least one parameter that enables or inhibits the user-specific industrial control program from accessing the file system service, the at least one parameter inaccessible by the user-specific industrial control program; and/or
the system specific firmware (SSF) for execution by the respective at least one industrial controller.

13. The industrial control system according to claim 1, said industrial control system comprising at least one declaration table, said declaration table comprising references to data variables of the industrial control program, said system specific firmware being arranged for handling data on the first data storage unit which data are related to said data variables referenced in said at least one declaration table by use of the file system service.

14. An industrial control system comprising at least one industrial controller having an operating phase for executing instructions defined in a user-specific industrial control program, said at least one industrial controller comprising:
at least one microprocessor;
at least one file system service;
a run-time system adapted to manage execution of instructions using the at least one microprocessor, said instructions being defined in the user-specific industrial control program;
a first data storage unit for storing data in the at least one industrial controller; and
system-specific firmware adapted to execute during the operating phase a predefined set of system tasks independently from the instructions defined in the user-specific industrial control program, wherein at least one system task of the predefined set of system tasks is configured to
a) use the at least one file system service to address a first dedicated storage location on the first data storage unit and to move data in the first dedicated storage location of the first data storage unit to a second data storage unit formatted for use with a file system, and/or
b) use the at least one file system service to address a second dedicated storage location on the first data storage unit and to move data from the second data storage unit to the second dedicated storage location of the first data storage unit,
said industrial control system comprising at least one declaration table, said declaration table comprising references to data variables of the industrial control program, said system specific firmware being arranged for handling data on the first data storage unit which data are related to said data variables referenced in said at least one declaration table by use of the file system service.

15. A method for transferring data to or from a first data storage unit of an industrial controller, the industrial controller including at least one file system service and being adapted to execute during an operating phase of the industrial controller instructions defined in a user-specific industrial control program, the method comprising:
using system-specific firmware provided for the industrial controller to execute at least one system task of a predefined set of system tasks independently from the user-specific industrial control program, wherein in the operating phase the at least one system task is adapted to
a) use the at least one file system service to move data in a first dedicated storage location of the first data storage unit to a second data storage unit formatted for use with a file system, or
b) use the at least one file system service to move data from the second data storage unit to a second dedicated storage location of the first data storage unit
use a configuration table to define a plurality of configuration parameters for the predefined set of system tasks, wherein the configuration table is changeable at run time of the user-specific industrial control program as a function of specific states of an industrial control system that includes the industrial controller.

* * * * *